(12) United States Patent
Morrison et al.

(10) Patent No.: US 9,939,848 B2
(45) Date of Patent: Apr. 10, 2018

(54) PORTABLE INFORMATION HANDLING SYSTEM DETACHABLE SUPPORT AND ATTACHMENT DEVICE

(71) Applicant: Dell Products L.P., Round Rock, TX (US)

(72) Inventors: Jason S. Morrison, Austin, TX (US); Daniel Coolidge, Pflugerville, TX (US); Kevin L. Kamphuis, Round Rock, TX (US); Laurent A. Regimbal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 14/472,930

(22) Filed: Aug. 29, 2014

(65) Prior Publication Data

US 2016/0062411 A1 Mar. 3, 2016

(51) Int. Cl.
*G06F 1/16* (2006.01)

(52) U.S. Cl.
CPC .......... *G06F 1/1669* (2013.01); *G06F 1/1632* (2013.01); *G06F 1/1654* (2013.01)

(58) Field of Classification Search
CPC ..... G06F 1/1656; G06F 1/1654; G06F 1/1669
USPC ............ 361/679.17, 679.09, 679.01, 679.28, 361/679.08
See application file for complete search history.

(56) References Cited

U.S. PATENT DOCUMENTS

| 5,306,957 | A | * | 4/1994 | Ellingham | H01H 23/22 200/33 R |
|---|---|---|---|---|---|
| 8,498,100 | B1 | * | 7/2013 | Whitt, III | G06F 1/1618 361/679.17 |
| 8,644,018 | B2 | * | 2/2014 | Hung | G06F 1/1632 16/302 |
| 2007/0070599 | A1 | * | 3/2007 | Chang | G06F 1/203 361/679.46 |
| 2008/0021634 | A1 | * | 1/2008 | Diaz | G01C 21/26 701/532 |
| 2013/0155583 | A1 | * | 6/2013 | Yang | G06F 1/1626 361/679.01 |
| 2013/0242495 | A1 | * | 9/2013 | Bathiche | G06F 1/1626 361/679.28 |
| 2013/0260828 | A1 | * | 10/2013 | Kim | G06F 1/1632 455/557 |
| 2014/0193193 | A1 | * | 7/2014 | Wikander | G06F 1/1616 403/322.1 |

(Continued)

*Primary Examiner* — Tuan T Dinh
*Assistant Examiner* — Rockshana Chowdhury
(74) *Attorney, Agent, or Firm* — Terrile, Cannatti, Chambers & Holland, LLP; Robert W. Holland (57) ABSTRACT

A tablet information handling system detachable base couples with a tablet information handling system by inserting a trapezoidal-shaped support into a trapezoidal-shaped opening of the tablet information handling system. The smaller perimeter of the support has room to fit in the larger perimeter opening of the tablet information handling system for ease of insertion, yet the support snuggly fits into the opening after complete insertion. A latch couples the support with an inclined lower surface so that pulling on the tablet information handling system without releasing of the latch translates into a more secure latch coupling. A latch release timer allows one-handed detachment by maintaining the latch in a released position for a predetermined time after latch release actuation.

18 Claims, 4 Drawing Sheets

(56) References Cited

U.S. PATENT DOCUMENTS

2014/0328014 A1* 11/2014 Lan ...................... G06F 1/1681
361/679.27

* cited by examiner

PORTABLE INFORMATION HANDLING SYSTEM DETACHABLE SUPPORT AND ATTACHMENT DEVICE

BACKGROUND OF THE INVENTION

Field of the Invention

The present invention relates in general to the field of portable information handling systems, and more particularly to a portable information handling system detachable support and attachment device, such as a tablet-to-docking station attachment interface for media stand, charging stand, monitor or keyboard supports.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems tend to increase end user productivity because end users can interact with information on the go. For example, end users often carry small-sized tablet information handling systems, such as smartphones, to access e-mail and the Internet through wireless interfaces, such as wireless wide area networks (WWAN) and wireless local area networks (WLAN). Generally, tablet information handling systems provide greater portability by using a touchscreen display as both an input and an output device so that the housing does not have to include a keyboard. Although a touchscreen input device, such as a displayed keyboard, provides improved portability for an end user by reducing the size and weight of the information handling system, displayed input devices tend to have limited productivity when compared against traditional input devices, such as mechanical keyboards. In order to improve productivity at tablet information handling systems, end users often turn to peripheral keyboards, such as docking station devices that include a keyboard and support the tablet in a vertical orientation similar to that of a conventional clamshell laptop information handling system. End users tend to appreciate the familiarity of the clamshell laptop configuration with the option of detaching the display portion for use as a tablet.

One difficulty with detachable keyboard docking stations for tablet information handling systems is that the tablet information handling systems are often designed to have a minimal footprint that provides decreased structural integrity for securely coupling with a docking station. Often, tablet information handling systems mounted in a vertical orientation over a detachable keyboard tend to wobble in an unstable manner. The wobble is typically increased by the "slop" or extra room designed in the tablet attachment point to make alignment by an end user of a tablet information handling system less difficult. Another difficulty with detachable keyboard docking systems is that the attachment point tends to include unattractive features on both the tablet and keyboard portions in order to obtain a secure connection that readily releases. Besides reducing the physical attractiveness of the system, the attachment and detachment mechanism is often difficult and awkward to use. For example, the small footprint of tablet information handling systems tends to call for small mechanical actuators and locks that are difficult for end users to manipulate. Often, attachment of a tablet to a keyboard base is a blind procedure in which the end user is unable to visually acquire opposing attachment devices, which often include alignment of multiple features simultaneously. End users can become frustrated if complex attachment devices require multiple attempts to engage with a tablet information handling system. Additional frustration often arises when the end user attempts to detach the tablet information handling system from the keyboard using an awkward two-handed operation.

SUMMARY OF THE INVENTION

Therefore a need has arisen for a system and method which provides a secure and user friendly base to hold a tablet information handling system in a viewing position.

In accordance with the present invention, a system and method are provided which substantially reduce the disadvantages and problems associated with previous methods and systems for supporting a tablet information handling system on a base. A support extends upward from the base with a tapered exterior that decreases in size as it extends from the base. The tablet information handling system has an opening that tapers inward in a similar manner to the outward taper of the support so that the support fits readily into the opening and fills the opening as insertion completes to provide a robust support contact.

More specifically, a tablet information handling system has a processor memory and display disposed in a planar housing to process and present information. An opening at one side of the planer housing accepts a support extending upwards from a base to hold the tablet in a vertical orientation above the base, such as in a clamshell configuration above a keyboard disposed in the base. The support and opening each have a matching trapezoidal shape that provides extra room at initial insertion of the support in the opening yet allows the support to substantially fill the opening upon complete insertion. First and second latches extend from opposing ends of the support with an inclined upper surface that pushes the latch to retract upon initial insertion of the support in the opening. An inclined lower surface of the latch interacts with the tablet information handling system after insertion. The angle of the inclined surface is designed so that any removal force on the tablet causes the latch to tighten and retain the tablet more securely. A latch release interfaces with the latch to retract the latch into the support for removal of the tablet information handling system from the base. A latch release timer maintains the latch in a retracted position for a predetermined time after activation of the release so that an end user can perform removal of the tablet information handling system during the predetermined time without holding the latch release in a released position. After the predetermined time, the latch returns to a retaining position that locks the tablet information handling system in place if the system has not been removed.

The present invention provides a number of important technical advantages. One example of an important technical advantage is that a tablet information handling system is held in a viewing position over a keyboard base in a secure and user friendly manner. A tapered tab extending from the keyboard base into a tapered opening provides "slop" to allow ease of fit while securing upon full insertion to a tight fit that reduces wobble. One central tab provides an easier manipulation by an end user to insert the tablet with an automatic lock that allows one-handed insertions as well as reversible installation. An angled latch contact face at the point of contact with the tablet increases the tightness at which the latch secures the tablet information handling system if a removal force is applied without activating a release. A timed release tab allows one handed release of the tablet information handling system by holding the release for a time after activation so that the end user does not have to hold the release while pulling on the tablet information handling system. Intuitive alignment, low insertion force, single-handed release and a stable docked position provides end users with a user-friendly solution for converting a tablet information handling system into a laptop-like system and back by attaching and detaching a keyboard base.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A tablet information handling system is supported above a base with reduced wobble by increasing the effective contact surface of the support with a tapered support and opening. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
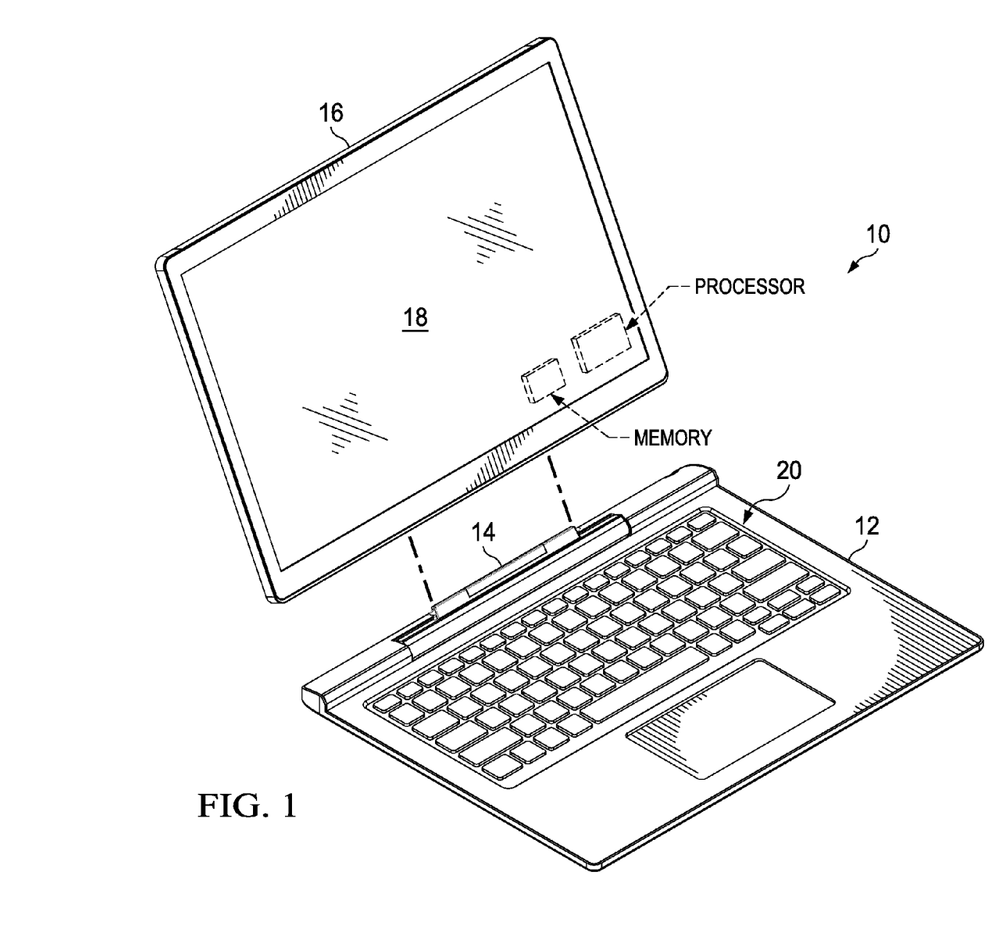
FIG. 1 depicts a tablet information handling system aligned to couple with a base support that holds the tablet information handling system in an open clamshell configuration and rotationally couples to provide a full range of motion between a closed position and a fully open position that provide use in a tablet mode while still coupled to the resources of the base.

Referring now to FIG. 1, a tablet information handling system 10 is depicted aligned to couple with a base 12 support 14 that holds tablet information handling system 10 in an open clamshell configuration and rotationally couples to provide a full range of motion between a closed position and a fully open position that provide use in a tablet mode while still coupled to the resources of the base. Tablet information handling system 10 has a planar housing 16 that integrates a touchscreen display 18. When free from base 12, an end user typically interfaces with a processor and memory disposed in housing 16 by holding housing 16 in one hand and making inputs through I/O devices depicted on display 18, such as a displayed keyboard. When coupled to base 12, a keyboard 20 disposed in base 12 provides a mechanical interface to for an end user to make inputs to tablet information handling system 10. In the example embodiment depicted by FIG. 1, support 14 is only one upward extending tab that inserts into an opening of tablet information handling system 10. A single centrally-located support 14 allows an end user to couple tablet information handling 10 with display 18 facing keyboard 20 in a clamshell configuration or to rotate tablet information handling system 10 so that display 18 faces away from keyboard 20 in a stand configuration. Although FIG. 1 depicts a tablet information handling system 10, in alternative embodiments other types of display devices might be supported, such as dumb display that presents information generated with processing components disposed in the base.

Figure 2:
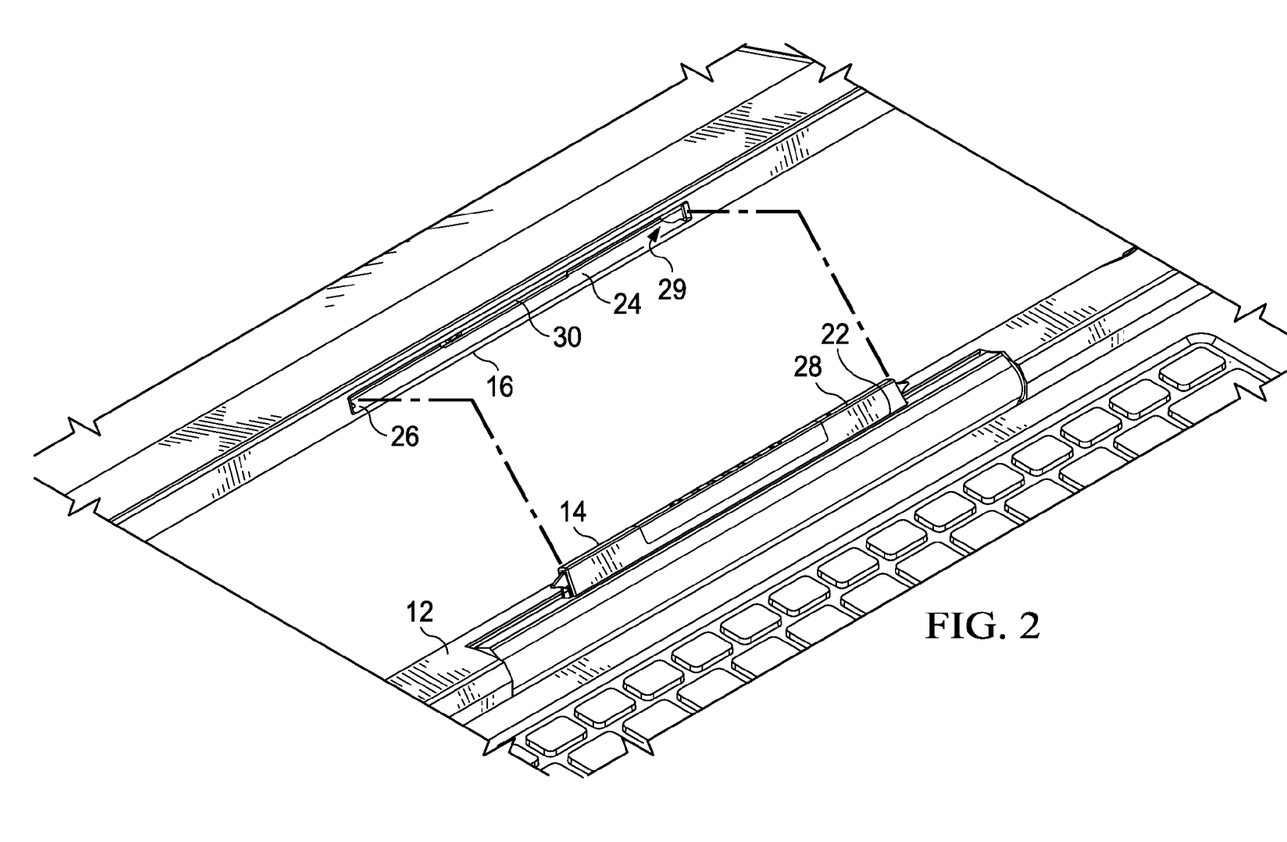
FIG. 2 depicts a system for supporting a tablet information handling system with opposing trapezoidal-shaped structures.

Referring now to FIG. 2, a system is depicted for supporting a tablet information handling system with opposing trapezoidal-shaped structures. Support 14 extends upwards from base 12 with an initial support base perimeter 22 size that is substantially equal to the size of an opening 24 of housing 16 at an outer perimeter 26. Support 14 extends upwards from base 12 to a distal location having a support distal perimeter 28 that has a size substantially equal to the size of an opening inner perimeter 30 located inside of housing 16. Substantially equal means that, when support 14 inserts into opening 24 so that opening outer perimeter 26 approaches base 12, the structure of support 14 contacts the structure within opening 24 to provide a reduced gap clearance so that tablet information handling system 10 is supported above base 12 with reduced wobble. Although the substantially matching opposed structures of support 14 and opening 24 provide a tight fit that increases the structural interaction for reduced wobble, the tapered perimeters of the opposing structures help the initial insertion of support 14 into opening 24 by providing space to align support 14 into opening 24. In the example embodiment, support 14 has a trapezoidal shape that matches a trapezoidal shape of opening 24. In alternative embodiments, extra space for initial insertion of support 14 into opening 24 may be provided by tapering one, two or three side walls 29 instead of all four side walls 29.

Figure 3:
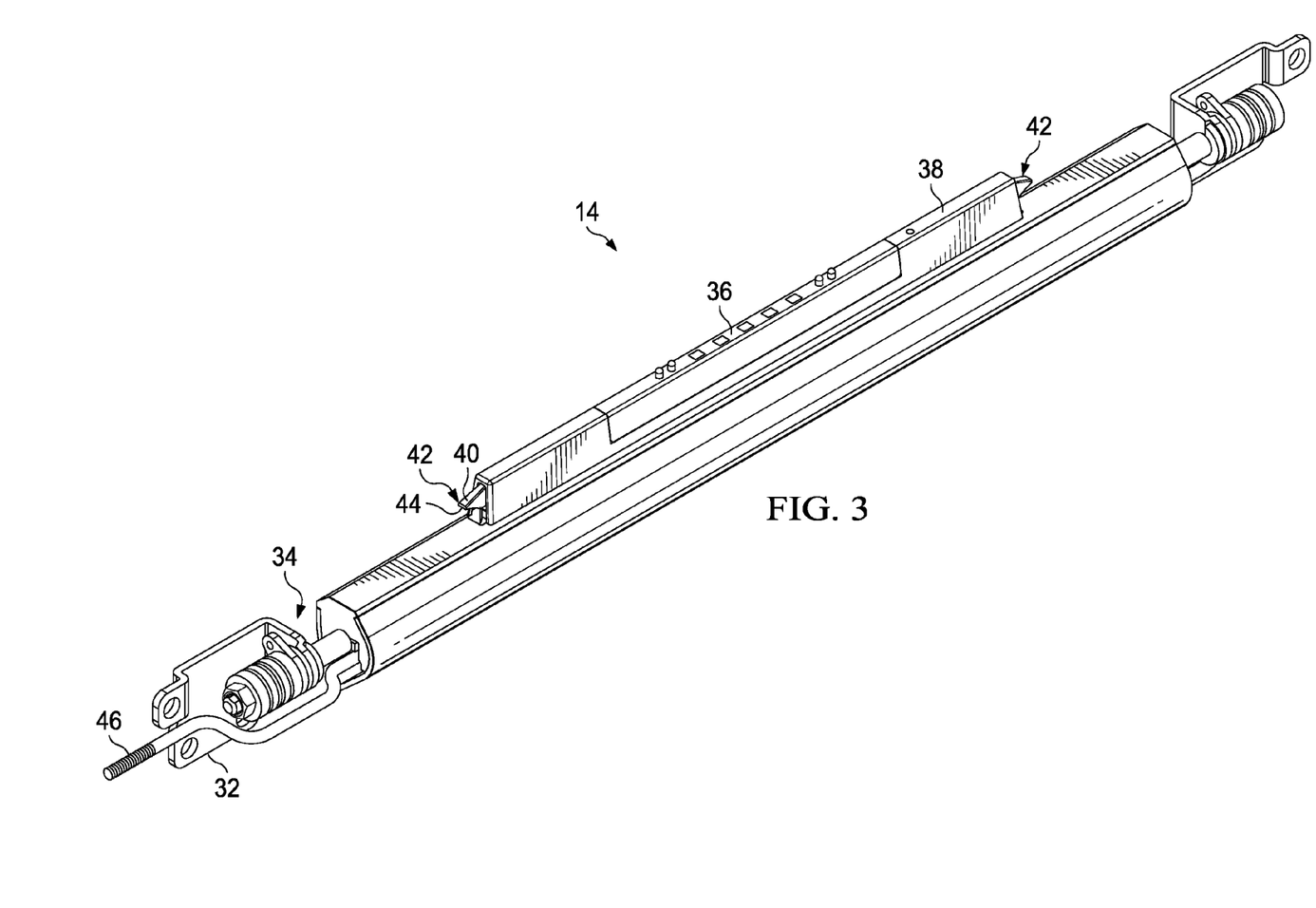
FIG. 3 depicts a detailed breakout view of a support that integrates with a base to provide a hinged coupling of a tablet information handling system and base.

Referring now to FIG. 3, a detailed breakout view depicts a support 14 that integrates with a base 12 to provide a hinged coupling of a tablet information handling system and base 12. A base coupler 32 at each end of support 14 couples to the base, such as screws. A hinge 34 couples to base couplers 32 and support 14 to support rotational movement of support 14 relative to a base 12. Hinge 34 allows support 14 to mimic rotational action provided by laptop or convertible information handling systems. A wireless interface 36 is a 60 GHz radio that wirelessly communicates data between a base 12 and a tablet information handling system 10, such as keyboard inputs made at the base when the tablet information handling system is coupled to support 14. Alternatively, pogo pins or other types of wired interfaces may be engaged to communication information between tablet information handling system 10 and base 12, either alone or in combination with wireless interfaces. A thermal interface 38 disposed at the side surface of support 14 provides thermal conductivity for transferring thermal energy from a tablet information handling system to a base through support 14. For example, a heat pipe interfaced with the processor of the tablet information handling system conducts heat from the processor to the opening where support 14 inserts so that thermal interface 38 conducts the heat out of the tablet information handling system.

During normal operation, an end user couples a tablet information handling system 10 to support 14 by placing an opening 24 formed in the housing 16 of tablet information handling system 10 over support 14. As support 14 enters the opening 24, the surface within the opening 24 presses on an inclined upper surface 40 of a latch 42 located on each end of support 14 to push the latch into support 14. A biasing force, such as spring, presses each latch 42 outward from support 14 so that each latch 42 couples to a slot in the opening 24 to couple the tablet information handling system 10 to the support 14. An inclined latch lower surface 44 engages with the housing 16 opening 24 inner surface slot to prevent removal of tablet information handling system 10 from support 14. In one embodiment, pulling on tablet information handling system 10 to generate a force against inclined latch lower surface 44 results in translation of the separation force to bias latch 42 out of support 14 so that an attempt to pull tablet information handling system 10 from support 14 provides a more secure attachment. In order to remove tablet information handling system 10 from support 14, an end user actuates a latch release 46 that translates the end user's input to retract latch 42 into support 14. In one embodiment, a latch release timer applies an actuation of latch release 46 to retract latches 42 for a predetermined time, such as 5 or 10 seconds, before releasing latches 42 to extend from support 14. A latch release timer provides for one-handed release of a tablet information handling system by allowing the end user to retract latches 42 with one hand at latch release 46, let go of latch release 46, then lift tablet information handling system 10 from support 14 using the same hand. If the end user fails to lift tablet information handling system 10 before expiration of the predetermined time, then latches 42 automatically bias outward to re-secure tablet information handling system 10 to support 14.

Figure 4:
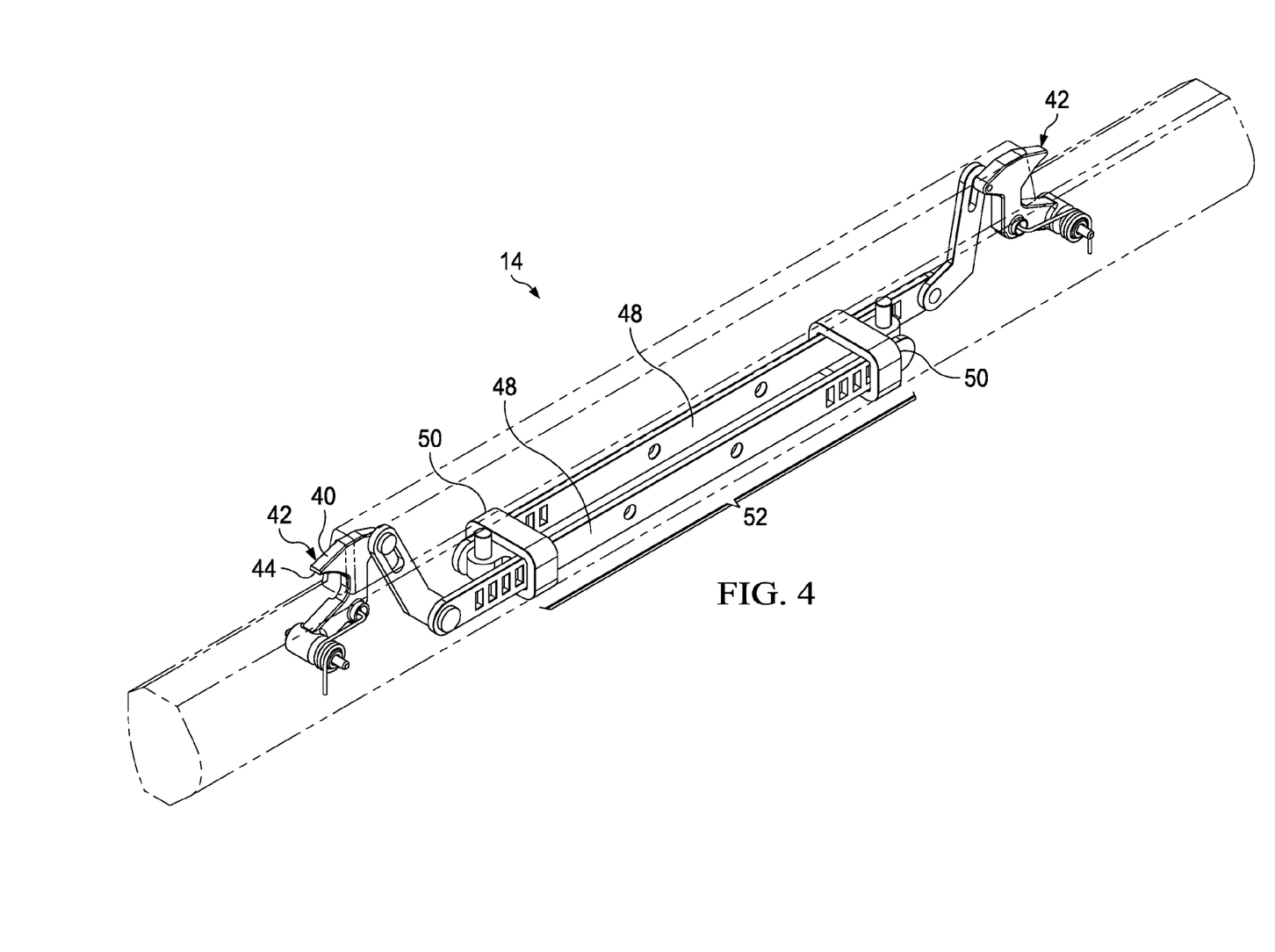
FIG. 4 depicts a side view of a support latch mechanism that couples the support to a tablet information handling system.

Referring now to FIG. 4, a side view depicts a support 14 latch mechanism 48 that couples support 14 to a tablet information handling system 10. Latch mechanism 48 couples with latch release 46 so that actuation of latch release 46 causes latch actuators 50 to compress towards each other and pull latches 42 into support 14. A latch release timer 52 holds latch actuators 50 in the compressed positions by pulling latch actuators 50 towards each other for a predetermined time, such as for 5 or 10 seconds. Latch release timer 52 maintains latch actuators 50 in a compressed position after latch release 46 is actuated and released by an end user until the predetermined time has lapsed. After the predetermined time, latch release timer 52 releases latch actuators 50, which bias outward to push latches 42 out of support 14. As an example, latch release timer 52 is a mechanical device, such as a fluid damper or a spring-loaded friction lever that moves at a desired rate until a release point is reached. In alternative embodiments, alternative types of mechanical timers or electromechanical devices, such as solenoids or shape memory alloy wires under the management of a processor in base 12, may be used to keep latches 42 retracted for a desired time followed by an automated release.

In the example embodiment depicted by FIG. 4, latches 42 are hinged devices that compel tablet information handling system 10 to remain in support 14 when a user attempts to pull on tablet information handling system 10 in a latched position. An upward force applied to the latch lower surface 44, such as might occur if a latched tablet information handling system is lifted away from support 14, is translated through the double hinge so that latch 42 is pulled outward and away from support 14, resulting in a downward pull by latch 42 on the tablet information handling system. In the example embodiment, are hinged on one axis with the location of the axis relative to the angle of the bottom contact surface of the latch operating to translate upward force on the tablet into a securing motion of the latch. Magnets 54 disposed along hinge 34 pull downward on a tablet information handling system as the system aligns to insert on support 14, to aid an end user in accurately attaching the tablet to the support without visual cues.

Although the present invention has been described in detail, it should be understood that various changes, substitutions and alterations can be made hereto without departing from the spirit and scope of the invention as defined by the appended claims.

What is claimed is:
1. An information handling system comprising:
a planar housing having an opening disposed on one side, the opening tapering to a smaller size from an outer size at the housing exterior to an inner size at the housing interior, the opening having a sidewall;
a processor disposed in the housing and operable to process information;
memory disposed in the housing and interfaced with the processor, the memory operable to store the information;
a display integrated in the housing and operable to present the information as visual images;
a base having a bottom surface operable to rest on a support surface and a keyboard disposed on an upper surface, the base having a support extending outwards with a tapered shape that inserts in the planar housing opening, the support bottom size substantially matching the opening outer size; and
a latch extending outward from the support, the latch having an inclined upper surface and an inclined lower surface, the latch collapsing into the support when force is applied against the inclined upper surface, the latch biased in an outwards direction from the support when force is applied against the inclined lower surface;
wherein the planar housing opening accepts the support along an insertion axis, the latch collapsing into the support along an axis perpendicular to the insertion axis during insertion of the support in the opening, the latch biasing outward from the support after insertion into the opening to couple with the planar housing at the opening sidewall; and wherein application of force at the planar housing along the insertion axis and away from the base translates to the latch inclined lower surface to bias the latch to extend into the sidewall to further secure the planar housing to the base.

2. The information handling system of claim 1 further comprising:

a hinge coupling the support to the base, the hinge operable to rotate the support between at least a position perpendicular to the base and parallel to the base;

wherein the support and the housing opening interact with substantially similar sized opposing trapezoidal shapes.

3. The system of claim 2 further comprising:

a latch release operable to retract the latch into the support; and a latch release timer interfaced with the latch and operable to maintain the latch retracted into the support for a predetermined time after retraction of the latch in the support by the latch release.

4. The system of claim 3 further comprising first and second latches disposed on opposing sides of the support.

5. The system of claim 4 wherein the base has only one support that inserts into the housing opening to couple the housing to the base.

6. The system of claim 5 wherein the support and latches have a symmetrical disposition to accept the housing in plural orientations relative to the base.

7. The system of claim 3 further comprising a wireless interface disposed in the support and the opening and operable to communicate inputs made at the keyboard to the processor.

8. The system of claim 3 further comprising a thermal interface disposed in the support and the opening and operable to conduct thermal energy from the housing to the base.

9. A method for supporting a display device having a display over a base, the method comprising:

integrating the display device in a planar housing with a processor that processes information, a memory that stores information and a display that presents information as visual images;

aligning an opening in the side of the display device with a support extending upwards from the base, the support having a perimeter at a distal end of substantially less than a perimeter of the opening of the display device and a perimeter proximate the base of substantially equal to the perimeter of the opening of the display device, the opening having sidewalls;

inserting the support into the opening of the display device along an insertion axis to bring the opening proximate the base;

latching the display device to the support with a latch biased to extend out of the support perpendicular to the insertion axis, the latch retracting into the support in response to a press by the display device during the inserting of the support into the opening of the display device and extending after insertion to engage the display device by inserting into the opening sidewalls; and translating a removal force along the insertion axis of the display device away from the base to an inclined lower surface of the latch, the removal force biasing the latch into the opening sidewall.

10. The method of claim 9 wherein latching further comprises:

pressing with the display device on an upper surface of a latch at the inserting to retract the latch into the support during the inserting; and biasing the latch out of the support to engage the display device after the support enters the opening.

11. The method of claim 10 further comprising:

pulling the display device away from the base after the biasing;

in response to pulling, engaging a portion of the display device with a bottom surface of the latch; and translating the pulling through the bottom surface of the latch to a latching mechanism to further bias the latch out of the support.

12. The method of claim 9 further comprising:

activating a release mechanism to retract the latch into the support;

releasing the release mechanism; and keeping the latch retracted into the support for a predetermined time.

13. The method of claim 12 further comprising automatically biasing the latch out of the support to engage the display device after the predetermined time.

14. The method of claim 9 wherein the display device opening and the base support each have a trapezoidal shape so that the support surface engages substantially all of the opening surface after completion of the inserting.

15. The method of claim 14 wherein the display device comprises a table information handling system, the method further comprising:

generating thermal energy in the tablet information handling system by processing information; and transferring the thermal energy through a thermally-conductive material to a thermal transfer device integrated in the support.

16. The method of claim 9 wherein inserting the support further comprises inserting only one support from the base into the display device to couple the display device to the base.

17. A detachable base and a tablet information handling system held by the detachable base, comprising:

a tablet information handing system having a planar housing, the planar housing integrating a processor that processes information, a memory that stores the information and a display that presents the information as visual images;

a base having a bottom surface operable to rest on a support surface and a keyboard disposed on an upper surface; and a support extending outwards from the base with a tapered shape to insert in an opening of the tablet information handling system along an insertion axis, the support perimeter proximate the base substantially matching a perimeter of the opening, the support perimeter tapering to a smallest perimeter furthest distal the base so that the support forms a trapezoidal shape;

a latch disposed in the support and aligned to engage with the tablet information handling system in an engaged position within the opening by moving perpendicular the insertion axis to engage a slot formed in the opening, the latch having an inclined lower surface;

a release operable to move the latch to a released position with movement perpendicular to the insertion axis by withdrawing the latch into the support; and a latch release timer interfaced with the latch and operable to maintain the latch in the released position for a predetermined time after the release moves the latch and to return the latch to the engaged position after the predetermined time;

wherein a removal force along the insertion axis of the base away from the tablet information handling system operates against the inclined lower surface to bias the latch to further extend into the tablet information handling system.

18. The detachable base of claim 17 wherein the trapezoidal shape substantially fills the opening of the tablet information handling system upon insertion of the support in the opening.

\* \* \* \* \*